United States Patent [19]

Dellor

[11] 3,725,881

[45] Apr. 3, 1973

[54] TWO TERMINAL BIPOLAR MEMORY CELL

[75] Inventor: Roger B. Dellor, Palo Alto, Calif.

[73] Assignee: Intersil Incorporated, Cupertino, Calif.

[22] Filed: Aug. 25, 1971

[21] Appl. No.: 174,878

[52] U.S. Cl. ..........340/173 FF, 307/292, 340/173 R

[51] Int. Cl. ........................G11c 11/40, H03k 3/286

[58] Field of Search.............307/289, 291, 292, 279; 340/173 R, 173 FF

[56] References Cited

UNITED STATES PATENTS 3,218,613 11/1965 Gribble ..............................340/173

*Primary Examiner*—Terrell W. Fears

*Attorney*—Gregg, Hendricson & Caplan

[57] ABSTRACT

A pair of transistors are interconnected with a single resistor as a bipolar integrated circuit to provide a structure having two stable states which may then represent binary states in a memory unit. Isolation and interconnection requirements are minimized to thus materially increase the packing density possible in a single chip.

6 Claims, 7 Drawing Figures

INVENTOR
ROGER B. DELLOR
BY
Gregg, Henderson & Caplan
ATTORNEYS

INVENTOR
ROGER B. DELLOR
BY
Gregg, Hendricson & Caplan
ATTORNEYS

INVENTOR
ROGER B. DELLOR
BY
Gregg, Henderson & Caplan
ATTORNEYS

TWO TERMINAL BIPOLAR MEMORY CELL

BACKGROUND OF INVENTION

There are known in the art a variety of different electronic circuits having two stable states. Bi-stable circuits are employed for a variety of different applications, one of which is in the storage of information.

Information storage or memory devices have commonly comprised magnetic units; however, with the advent of integrated circuitry, it has become practical to form memory units of electronic circuits. Aside from the normal goals of circuit design, it is desired in the formation of integrated circuit memory units to minimize the size thereof. The number of memory cells per unit of circuit area is commonly termed "packing density," which is determined, at least in part, by circuit complexity and isolation requirements. In practice there are technological limits for the physical size of an integrated circuit. Although these are continually being increased, at any one time the maximum storage that can be placed in a single unit is related to the size of an individual memory cell. Higher packing densities, therefore, enable larger storage memory units to be constructed.

Considering integrated circuits somewhat further, it is noted that individual devices are formed in a single semiconductor chip. Separate devices, such as transistors and resistors, may be isolated from each other in the chip by the diffusion of barrier zones and interconnection of semiconductor contacts may be provided by metal film conductors and resistors deposited atop the outside protective layer on the chip. Integrated circuit design is relatively complex and resultant integrated circuits are oftentimes highly complicated.

In common with other integrated circuits, it is highly advantageous in integrated circuit memory units for common transistor connections to be employed, particularly collector connections, so that a buried layer in the chip may be provided as a common collector connection without the necessity of applying metal connections to the collectors. This then materially decreases the isolation requirements to simplify device fabrication and minimize space requirements.

Conventional bipolar integrated circuit memory units require complete isolation of each transistor. A conventional bipolar integrated circuit memory cell requires about 30 sq. mils of chip area and, while this may be considered to be very minute, the present invention provides for a material reduction in the size of an individual cell.

SUMMARY OF INVENTION

The basic memory cell of the present invention comprises a pair of transistors having the emitters thereof connected together and the collector of a first of the transistors connected to the base of the second. A common connector to a plurality of cells is resistively coupled to the collector of the first transistor and directly coupled to the collector of the second transistor. A reference voltage which may be derived from the above-noted common connector is applied to the base of the first transistor and an output terminal is connected to the emitters of the transistors. It will be seen that for a plurality of such cells the collectors of one of the transistors of each cell are connected in common so that isolation between these transistors is not required.

A relatively simple manner of reading and changing the content of individual cells of a plurality thereof is also provided herein. Means to this end may, for example, comprise an additional emitter in the second transistor of each cell coupled by a diode back to the base of such transistor. This second emitter is also connected to what may be termed a common Y-line with the common emitters of each cell being resistively coupled to a common connection such as ground and a common X-line being coupled to the transistor collectors as noted above.

The memory cell of the present invention has two stable voltage states with cell current being variable within predetermined limits in each state. The invention may be operated, for example, to produce an output current or an absence of such current in a common Y-line by varying the voltage applied to a common X-line. It is also noted that the cell can be arranged so that neither of the transistors thereof saturate.

A preferred physical configuration of the present invention requires only a 6 sq. mil area upon a semiconductor chip as compared to about a 30 sq. mil area for a standard bipolar cell, so as to thus provide for a much greater packing density than has hitherto been possible. The cell of the present invention furthermore provides for a faster operation than standard memory cells and, additionally, provides a material simplification in metal interconnections in integrated circuit fabrication.

DESCRIPTION OF FIGURES

The present invention is illustrated as to particular preferred embodiments thereof in the accompanying drawings wherein.

DESCRIPTION OF PREFERRED EMBODIMENTS

Figure 1:
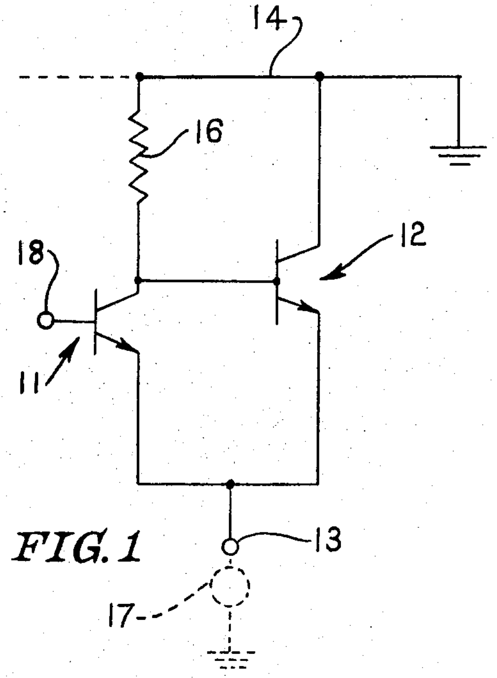
FIG. 1 is a wiring diagram of a simple memory cell in accordance with the present invention.

Reference is first made to FIG. 1 of the drawings hereof illustrating a pair of transistors 11 and 12 interconnected to provide an essentially two terminal structure having two stable voltage states for a defined current. Referring to FIG. 1, it will be noted that the emitters of the transistors 11 and 12 are coupled together and to a terminal 13, while the collector of transistor 11 is directly coupled to the base of transistor 12. A common line 14, indicated in this illustration to be grounded, is directly connected to the collector of transistor 12 and is coupled through a resistor 16 to the collector of transistor 11. This basic circuit has two stable voltage states of operation wherein either transistor 11 or transistor 12 is conducting.

Considering briefly operation of the circuit of FIG. 1, first assume connection of a voltage source 17 to the terminal 13 and an identity of the base-emitter voltages $V_{BE}$ of the transistors and a negative voltage $-V_{ref}$ applied to terminal 18 connected to the base of transistor 11.

With regard to the flow of current in the circuit, assume that the potential $V_{out}$ of the voltage source 17 is lowered below ground until it reaches $-V_{BE}$. At this point transistor 12 will begin to conduct. For $V_{out}$ slightly more negative than $-V_{BE}$. The current $I_{out}$ flowing at terminal 13 is given by $$I_{out}=\frac{(V_{out}+V_{BE})}{R_{16}}\beta$$

Current flow into terminal 13 is considered positive, $\beta$ is considered to be the common emitter current gain of transistor 12 and $R_{16}$ is considered to be the resistance of resistor 16.

As the voltage at terminal 13 is lowered further to the point where $V_{out} = -V_{ref} - V_{BE}$ transistor 11 will begin to conduct, shunting some base drive from transistor 12. As the current flowing through transistor 12 is the product of its base drive and $\beta$ the current $-I_{out}$, flowing from the cell, will reduce as transistor 11 begins to conduct. When the current flowing into the collector of transistor 11 equals $V_{ref}/R_{16}$ transistor 12 will be completely off. At this point $$I_{out} \cong -V_{ref}/R_{16}$$

and $$V_{out} \cong -V_{ref}-V_{BE}$$

Ordinarily transistor 12 changes from its maximum conducting state to being held off by transistor 11, with a very small change in voltage $V_{out}$. As $V_{out}$ is further increased in the negative direction, transistor 11 first saturates then the cell current $-I_{out}$ follows the exponential curve expected from the base-emitter diode of transistor 11 in series with the voltage source $V_{ref}$.

Assume now connection of a current source to terminal 13 in place of voltage source 17, to provide the current $-I_{out}$. It is evident that for values of $I_{out}$ between the approximate limits of $-\beta V_{ref}/R_{16}$ and $-V_{ref}/R_{16}$ two stable output voltage states exist given approximately by $$V_{out}=I_{out}R_{16}/_{\beta}-V_{BE} \text{ and}$$

$$V_{out}=V_{ref}-V_{BE}$$

Figure 4:
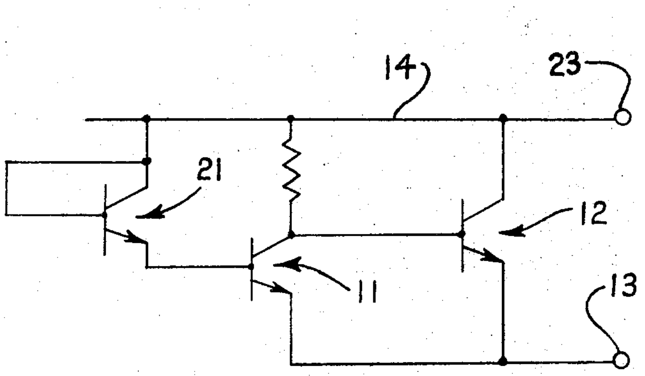
FIG. 4 is a plot of current vs. voltage for the circuit of FIG. 3 and illustrating the two stable states of operation thereof.
Figure 3:
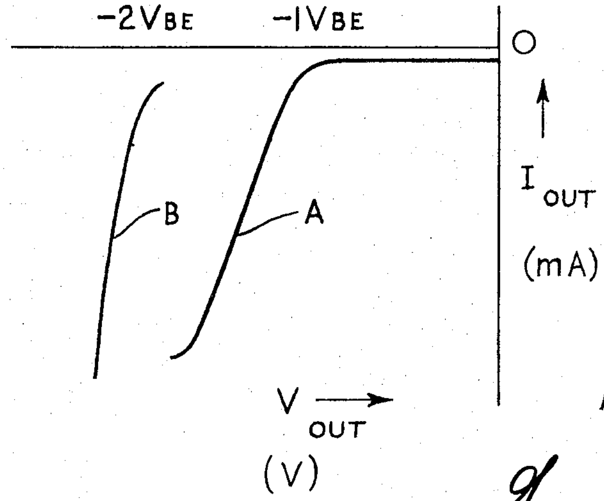
FIG. 3 is a wiring diagram of a memory cell in accordance with the present invention.

The operation briefly described above is further illustrated in FIG. 4, derived from the circuit of FIG. 3. The curve A illustrated the current-voltage relationship in a first stable state of operation wherein the transistor 12 is conducting. The curve B illustrates the second stable state of operation wherein the transistor 11 is operating. It will be seen that the current voltage characteristic of FIG. 4 is discontinuous in that the switching from one state to another of the circuit is substantially instantaneous.

With regard to the provision of a reference voltage to the base of transistor 11, it is noted that this may be accomplished internally of the circuit, as illustrated, for example, in FIG. 3. A third transistor 21 is connected to couple the base of transistor 11 through a single PN junction to the line 14. As illustrated in FIG. 3, the emitter of transistor 21 is directly connected to the base of transistor 11 and the base and collector of transistor 21 are connected together and to the line 14. The two terminals of the device will thus be seen to be provided at 23 and 13. In this circuit configuration the voltage applied to the base of transistor 11, termed above $V_{ref}$ is, in fact, the $V_{BE}$ of transistor 21. With each of the transistors having the same $V_{BE}$, $V_{out}$ at terminal 13 will then equal $-2V_{BE}$ when transistor 11 begins to turn on and shunt base drive from transistor 12 for turning off this latter transistor.

Figure 2:
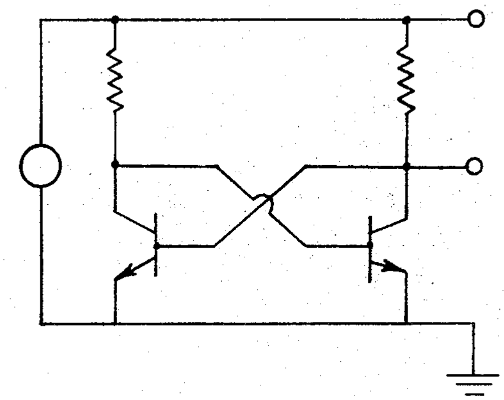
FIG. 2 PRIOR ART
FIG. 2 is a wiring diagram of a simple standard memory cell of the prior art.

With regard to conventional bi-stable circuits such as illustrated, for example, in FIG. 2, it will be noted that prior art circuits of the type shown require isolation of each transistor from each other and from all other transistors and resistors. The collectors of each of the transistors in the prior art circuit are resistively coupled to a common line and consequently, insofar as integrated circuit fabrication is concerned, it is then necessary to electrically isolate the collectors of each of the transistors. Furthermore, it is noted that the prior art circuit requires at least one crossover wherein electrical conductors cross each other. Integrated circuit fabrication techniques are available to accomplish metal crossovers; however, it is recognized that such crossovers introduce an added degree of complexity in the resultant integrated circuit and in the processing steps thereof.

In order to simplify read and write operations with circuits in accordance with the present invention, it is possible to somewhat increase the complexity of the cell. In this respect reference is made to FIG. 5 illustrating one configuration of a memory cell in accordance with the present invention and adapted for ready read and write operations.

Figure 5:
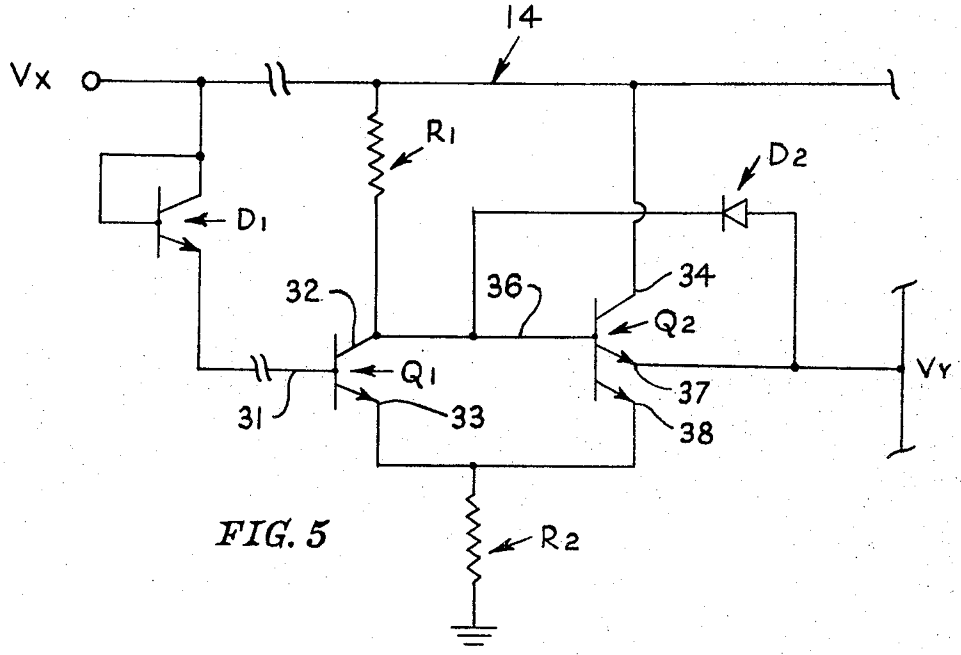
FIG. 5 is a wiring diagram of a memory cell in accordance with the present invention and including simple means for reading and changing the condition of the circuit.

With regard to reading and writing with the memory cell of the present invention, reference is made to FIG. 5 illustrating a simple manner of inserting information in the cell and retrieving such information. In order to simplify nomenclature, the elements of the circuit of FIG. 5 are identified by letters and subscripts with the first and second transistors being $Q_1$ and $Q_2$. The reference voltage for $Q_1$ is provided by a transistor in the manner illustrated in FIG. 3 and identified in FIG. 5 as $D_1$. The individual portions of the transistors $Q_1$ and $Q_2$ are separately numbered in FIG. 5 in order to provide correlation with the illustration of a physical layout of the circuit in FIG. 7 described below. The resistor $R_1$ is shown to be connected between the collector 32 of $Q_1$ and a common line herein denominated as $V_X$ and corresponding to line 14 of FIGS. 1 and 3. The collector 34 of $Q_2$ is directly connected to $V_X$ and an emitter 37 of $Q_2$ is directly connected to a common line herein termed $V_Y$. The transistor $Q_2$ is provided with a second emitter 38 which is directly connected to the emitter 33 of $Q_1$ and grounded through a resistor $R_2$.

There is additionally provided in this circuit of FIG. 5 a diode $D_2$ shown with its anode connected to the $V_Y$ line and its cathode to the base 36 of transistor $Q_2$ and collector 32 of transistor $Q_1$.

The circuit of FIG. 5 is operated to place transistor $Q_2$ in a conducting state of a "1" condition and in the non-conducting state of a "0" condition, for example.

This may be accomplished by maintaining $V_X$ at a predetermined voltage level and changing the voltage $V_Y$. With the voltage $V_Y$ at a slightly lower voltage than $V_X - 2V_{BE}$, the current through resistor $R_2$ will be supplied by transistor $Q_1$. The collector 32 of transistor $Q_1$ will therefore be in a low voltage state holding off transistor $Q_2$. The current flowing into line $V_Y$ will be essentially zero. As voltage $V_Y$ is increased a point will be reached when $D_2$ becomes forward biased and begins to supply some of the collector current of transistor $Q_1$ thus pulling it further away from saturation. A small positive current will now be flowing into the line $V_Y$. As $V_Y$ approaches $V_X$ transistor $Q_2$ will begin to turn on turning transistor $Q_1$ off by regenerative action at its emitter 33. Current into line $V_Y$ will again drop to effectively zero. A "one" has now been written into the cell. If the voltage on line $V_Y$ is now lowered to a value somewhat less than $V_X - V_{BE}$ current will be drawn from emitter 37 of transistor $Q_2$, indicating transistor $Q_2$ is conducting. This accomplishes the read operation. As the voltage on line $V_Y$, and hence on emitter 37 of transistor $Q_2$, is decreased further emitter 38 of transistor $Q_2$ will follow until transistor $Q_1$ turns on. Transistor $Q_2$ will then have its base drive diverted and turn off. The current into line $V_Y$ will again fall essentially to zero.

Figure 6:
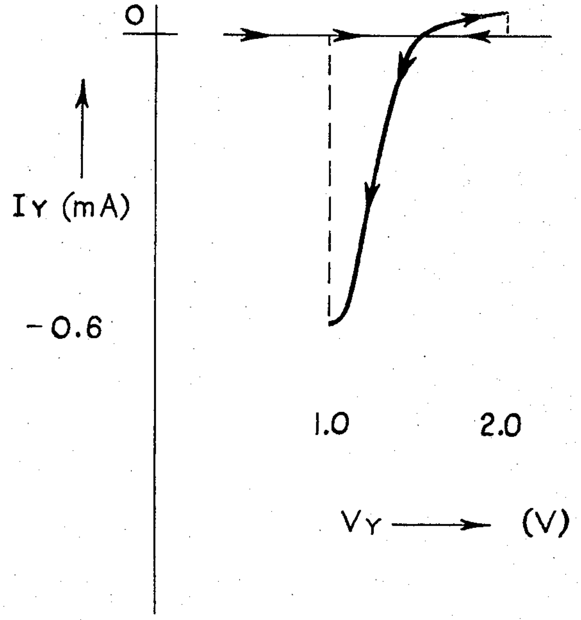
FIG. 6 is a plot of current vs. voltage for the circuit of FIG. 5.

Considering merely as an example some circuit values $R_1$ may be 20K and $R_2$ 14K with $V_X$ maintained at 2.05 volts. Assuming $V_{BE}$ and $\beta$ values typical of silicon integrated circuit transistor structures and that transistor $Q_1$ is initially conducting, with $V_Y$ at 1.2 volts the current into line $V_Y$ is zero, indicating that the information stored in the cell is "0." Raising $V_Y$ to 2.0 volts causes transistor $Q_2$ to turn on and thus $Q_1$ to turn off, writing the information "1" into the cell. Lowering $V_Y$ to 1.2 volts now causes $-300\mu$ A to flow in line $V_Y$ indicating that the information stored in the cell is now a "1." Lowering voltage $V_Y$ further to 0.95 volts allows $Q_1$ to start conducting and thence turn off $Q_2$. This operation is generally illustrated by the plot of FIG. 6. With line $V_Y$ unconnected such that the current flowing in it is zero, the current flowing internally in the cell through resistor $R_2$ and supplied by voltage $V_X$ is approximately $100\mu$ A. As indicated in FIG. 6, the available read current from line $V_Y$ is several times greater than the cell quiescent current with $V_Y$ disconnected.

Figure 7:
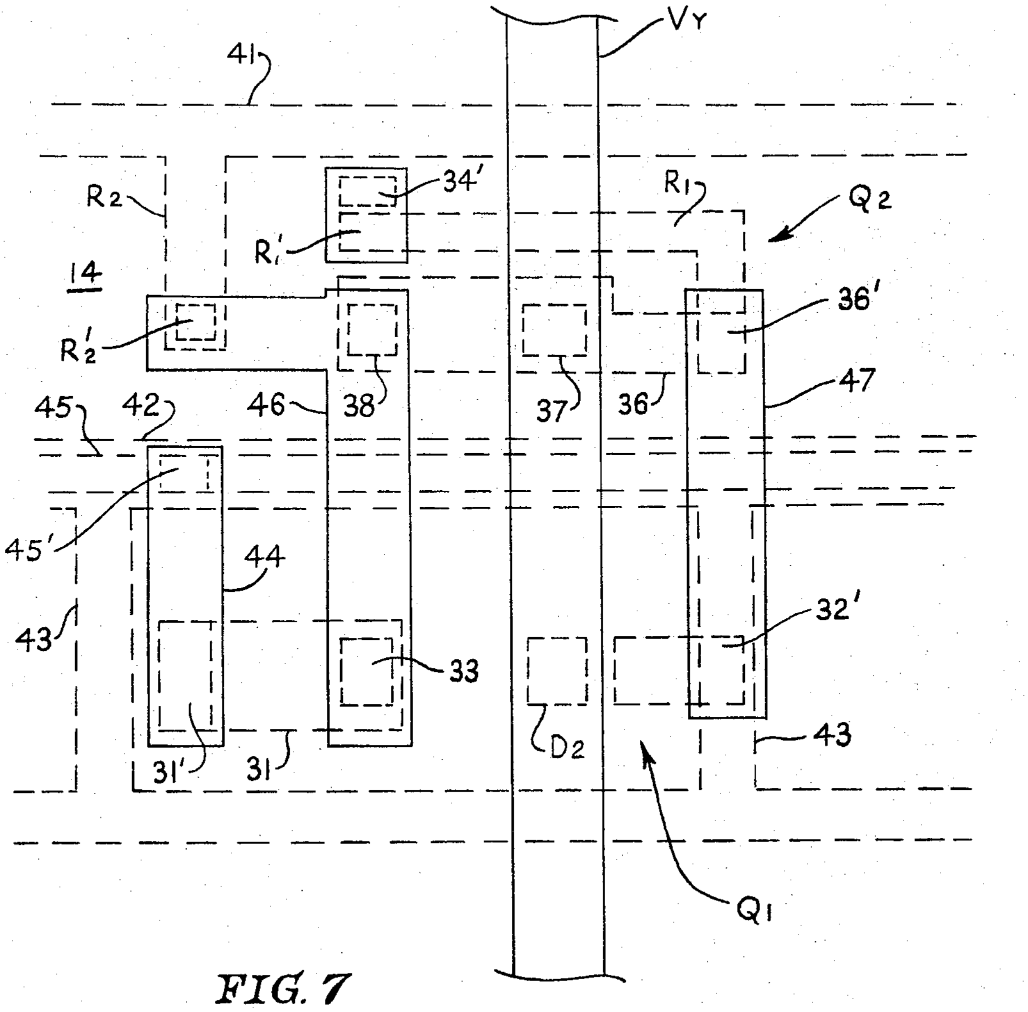
FIG. 7 is an illustration of one possible physical configuration of the circuit of FIG. 5 in plan view.

There is illustrated in FIG. 7 one possible physical configuration of an integrated circuit memory cell in accordance with the present invention. This illustration is a schematic plan view with metal conductors being illustrated in solid lines and diffused regions and contacts being illustrated by dashed lines. In FIG. 7 the numerals and letters of FIG. 5 are employed for the same elements of the circuit and in those instances wherein a contact area is different from the area of the region being contacted, the region number or letter is primed to indicate only the contact area. Referring now to FIG. 7, it will be seen that the transistor $Q_2$ is formed between two isolation barriers 41 and 42 illustrated to extend laterally of the chip or the like. The region between the isolation barriers may be considered to be a common collector region 14 for a plurality of like transistors $Q_2$ in an overall memory array. This common collector region does, in fact, then comprise the $V_X$ line of FIG. 5 of the line 14 of FIGS. 1 and 3. In conformity with conventional practice there may be provided a buried collector region of highly doped N-type material in the N-type region between the isolation barriers 41 and 42; however, no attempt is made to illustrate same in FIG. 7. The base 36 of transistor $Q_2$ is illustrated as having a common connection with diffused resistor $R_1$ which, in fact, is a continuation of the base of transistor $Q_2$. The other extremity of resistor $R_1$ is shown to be connected to a contact region 34' of the collector 34 of transistor $Q_2$.

With regard to transistor $Q_1$ it is noted that same is illustrated as being surrounded by an isolation barrier 43 so that the transistor $Q_1$ is isolated from other transistors. In an array of cells in accordance with the present invention, successive transistors $Q_1$ would be isolated from each other and from transistors $Q_2$. The base 31 of transistor $Q_1$ is shown to be connected at base contact 31' by a metal conductor 44 to a contact 45' of an N-type region 45 diffused within the boundaries of isolation barrier 42 and adapted to carry the reference voltage $V_{ref}$. A metal conductor 46 connects the emitter 33 of transistor $Q_1$ to the emitter 38 of transistor $Q_2$ and also to the contact $R_2'$ of a diffused P-type resistor $R_2$, in turn extending to connection with the isolation barrier 41 which is electrically grounded. The $V_Y$ line is provided as a metal conductor contacting emitter 37 of transistor $Q_2$ and a diffused P-type region in the collector of $Q_1$ to thereby define a PN junction as diode $D_2$ connecting $V_Y$ and the collector of transistor $Q_1$. As in the case of a majority of integrated circuits, the isolation diffusion regions are connected to electrical ground at some point and in FIG. 7 such connection is assumed to be external to the cell on the silicon chip. A metal conductor 47 is illustrated as connecting a contact region 32' of the collector of transistor $Q_1$ and a contact region 36' of the base of transistor 32.

Further with regard to the physical layout of the circuit of FIG. 7, it is noted that certain provisions are made therein for minimizing the physical size of same. Thus, for example, the contact region 32' of the collector of transistor $Q_1$ is shown to extend into the isolation barrier 43 but not to extend past the isolation barrier. It is also noted that, instead of providing the diode $D_1$ of FIG. 5 in the physical layout of FIG. 7, the diffused region 45 is employed as a source of $V_{ref}$ so that in an overall array a substantial number of diffused regions are eliminated.

While the physical configuration of the memory cell illustrated in FIG. 7 may not be optimized by circuit design standards, it does provide an operable memory cell adapted for multiplication on a single silicon chip wherein rows of transistors $Q_2$ have a common collector. This then provides a material saving by eliminating isolation regions between successive transistor collectors along such rows and naturally providing the X address line $V_X$, within the silicon bulk. It is furthermore noted that the circuit of FIG. 7 does not require any metal crossovers, i.e., crossing electrical connections exteriorly of the silicon bulk, or any extra isolated regions to contain the circuit resistors.

Certain advantages of the present invention have been particularly noted above, such as the minimal size thereof in an integrated circuit to thereby improve or increase packing density possible. It has also been noted that X-line access, such as $V_X$ of FIGS. 5 and 7, is located in the silicon bulk to thereby materially simplify metal interconnections in the integrated circuit. It is additionally noted that the cell may be arranged to operate in a non-saturating condition for the transistors thereof; operation of the circuit is very fast because of this and the high available read current. Only relatively low resistor values are required for a particular cell current, and decoding is very simple. There is thus provided a highly advantageous and simplified memory cell by the present invention.

It is not intended to limit the present invention to the precise terms of description or details of illustration for it will be apparent to those skilled in the art that various modifications are possible.

What is claimed is:

1. An integrated circuit memory cell comprising
 first and second transistors having the collector of the first transistor directly connected to the base of the second transistor and the emitters of the transistors directly connected together,
 a first terminal directly connected to the collector of the second transistor and resistively coupled to the collector of the first transistor,
 a second terminal connected to the emitters of said transistors, and
 means applying a reference voltage to the base of said first transistor.

2. An integrated circuit memory unit in a single chip of semiconducting material comprising
 a plurality of memory cells,
 each memory cell having first and second diffused transistors,
 means in said chip electrically isolating the collector of said first transistor of each cell from all other transistors in the bulk semiconducting material of the chip,
 the collectors of the second transistors of a plurality of cells comprising a common collector region,
 a diode connecting the base of the first transistor to the collector of the second transistor of each cell,
 a resistor connecting the collectors of first and second transistors of each cell,
 a conductor connecting the collector of the first transistor to the base of the second transistor of each cell, and
 a conductor connecting the emitters of the first and second transistors of each cell.

3. The integrated circuit of claim 2 further defined by
 a first terminal connected to the collector of said second transistor of each cell, and
 a second terminal connected to the common emitter connection of the transistors of each cell.

4. The integrated circuit of claim 2 further defined by
 the second transistor of each cell having a second emitter connected to a conductor as a first cell terminal,
 a diode connecting the second emitter and base of the second transistor of each cell, and
 a second terminal connected to each common collector region.

5. An integrated circuit memory unit having all active elements formed in a single chip of semiconducting material comprising
 a. isolation regions defining a first plurality of common collector regions with terminals, and a plurality of single collector regions,
 b. a first transistor in each single collector region and each first transistor being connected with a second transistor in a common collector region as a memory cell,
 c. a plurality of second transistors in each common collector region, and
 d. the connections of each cell including a diode coupling the base of the first transistor and collector of the second transistor, a resistor connecting the collector of the first transistor and base of the second transistor, and conductors connecting the collector of the first transistor to the base of the second transistor and the emitters of the transistors together.

6. The integrated circuit of claim 5 further defined by connections to each cell for switching the cell between conduction of said first and second transistors of each cell.

* * * * *